Patented Jan. 13, 1931

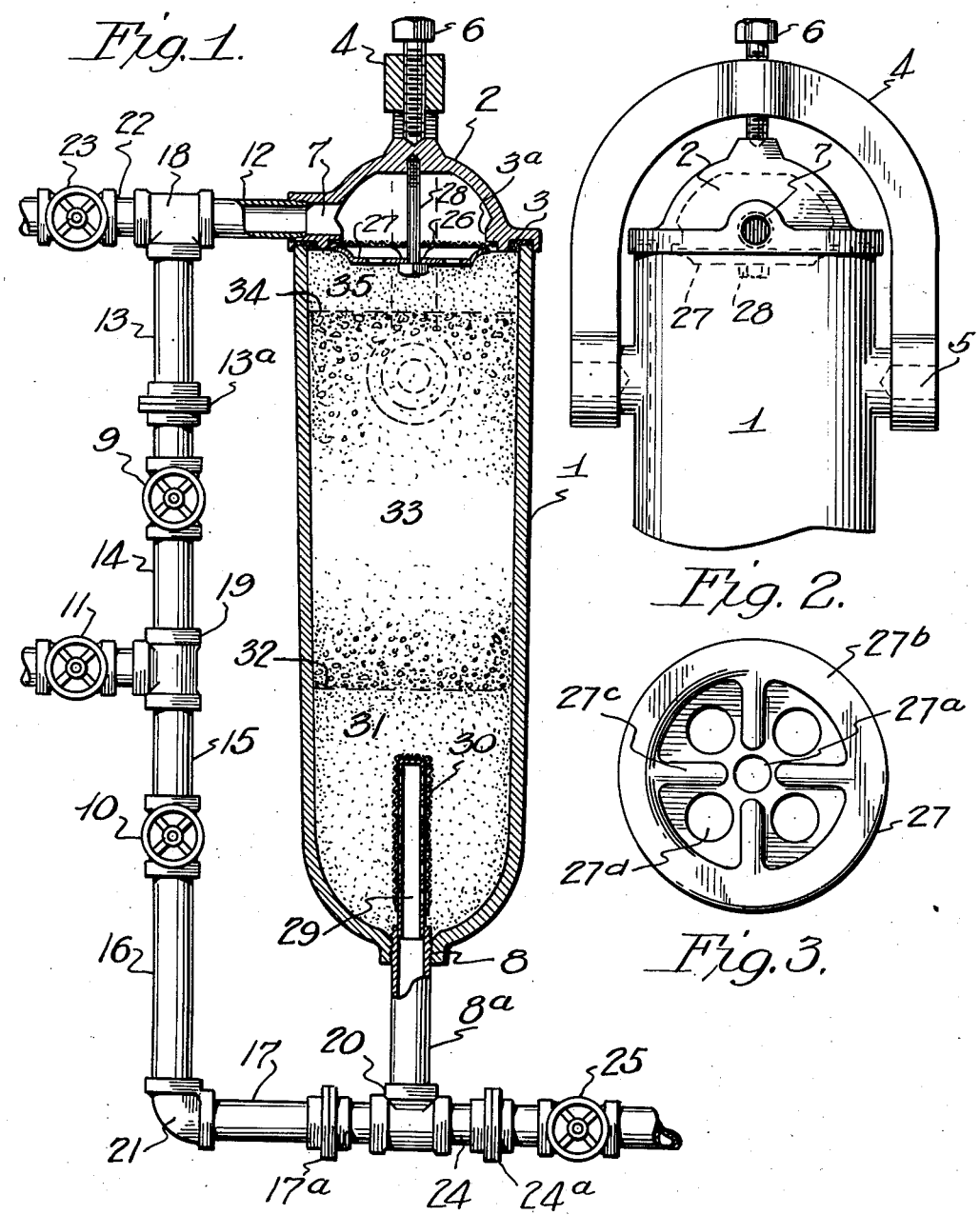

1,788,510

UNITED STATES PATENT OFFICE

ROY BLAIR EVERSON, OF CHICAGO, ILLINOIS, ASSIGNOR TO EVERSON FILTER COMPANY, OF CHICAGO, ILLINOIS, A CORPORATION OF ILLINOIS

WATER FILTER

Application filed April 6, 1929. Serial No. 352,963.

My present invention relates to water filters, and particularly to that type commonly known as domestic filters which are used in the homes and offices on drinking water fountains and the like, where the drinking water supply from the city mains has been chemically treated, fitting it for human consumption. This treated water carries a large quantity of mechanically suspended foreign matter, a very objectionable odor, and a pronounced and disagreeable taste, especially when chlorine has been introduced.

The object of this invention, therefore, is to provide a filter as a single unit and one which will not only remove the mechanically suspended foreign matter from the water, but which will also deodorize and clarify the water, and remove its objectionable taste.

A further object is to provide a filter which is readily accessible for cleaning and recharging, and one that will permit of back washing.

A still further object is to provide an effective baffle system to prevent short circuiting of the flow of water through the filter, operating in conjunction with a removable discharge strainer.

Having these objects in view, my invention consist in the novel design and arrangements of parts hereinafter set forth, and as is more particularly pointed out in the appended claims and as is further illustrated in the drawing, in which:—

Figure 1 is a vertical section through the filter embodying my invention, the pipe manifold details being shown in elevation; Figure 2 is an elevation of the top of the filter as shown at Figure 1, the pipe manifold omitted for sake of clearness; and Figure 3 is an enlarged top plan view of the baffle or distributing plate.

Referring to the drawing, my invention comprises an open top, cylindrical shell 1, having tapering walls, and provided with a semispherical dome or cover plate 2, which has a recessed flange carrying a gasket 3, adapted as a seal for the open end of the cylinder. The cover is held in place by means of a yoke 4, pivoted at 5 to the cylinder; a cap screw 6 passes through the yoke and bears against the top of the cover plate so that as the screw 6 is tightened against the cover plate, the plate becomes sealed to the cylinder. This construction obviously provides a closure for my filter which permits of ready access to the interior of the filter. The filter shell thus formed, comprising the cylinder 1 and the cover 2, is provided with an inlet opening 7, in the cover, and an outlet opening 8 in the bottom of the cylinder, both of which openings are tapped to receive standard pipe, and which openings are connected by means of a pipe manifold which consists of the valves 9, 10 and 11 and the pipes 12, 13, 14, 15, 16 and 17; the T's 18, 19 and 20, unions 13a and 17a and elbow 21. An extension pipe 22 and valve 23 lead to the waste connection for flushing or cleaning (not shown) and an extension pipe 24, union 24a and valve 25 lead to the drinking water fountain or faucet (not shown).

Adjacent the recessed flange on the cover plate, and as an integral part thereof, is an extension 3a, which forms a seat for a fine wire mesh screen 26, and a baffle or distributing plate 27. The plate 27 is held in position by means of a cap screw 28, passing through an aperture 27a in the center of the plate 27, and being threaded into the top of the dome or cover plate 2. This distributing plate 27, is dished, allowing the outer edge of its top surface 27b to bear against the wire mesh 26 and seat into the extension 3a. Radial baffles 27c are pressed or cast into this plate 27, and between these baffles, in the depressed central portion of the plate are a plurality of apertures 27d. In the bottom of the shell, through the opening 8, a perforated pipe 29 extends up into the filter. A screen 30 of relatively fine wire surrounds the pipe 29 and is affixed thereto, so that the pipe and screen being attached to the pipe 8a, may be removed with the pipe 8a through the threaded opening 8.

In operation, the pipe 8a carrying its perforated extension 29 and screen 30, is affixed to the filter shell as shown. The filter is then partially filled with finely divided crystals of silica or quartz 31, up to the level indicated as 32. The shell is next filled with a deodorizing medium such as bone black, indicated as 33 on the drawing, up to the level 34, the balance of the shell being filled with silica crystals 35 as before, so that when the cover or dome 2 is clamped in place, the distributing plate 27 will be pressed down upon and lie in actual contact with the quartz.

All valves are closed. The valves 11, 9 and 25 are opened which allows the city water which is piped to the valve 11, to pass through the pipes and fittings 19, 14, 13, 18 and 12 and into the dome or cover, down through the screen 26, and through the apertures 27d in the plate 27; from here the water passes through the filtering and deodorizing beds, and through the screen 30 and perforated pipe 29, through the pipe and fittings 8a, 20, 24 and 25, where the water leaves, being removed of its odor, taste, and mechanically suspended impurities. In closing the valves 9 and 25 and opening the valves 23 and 10, the water is allowed to reverse its flow, and back wash through the valve 23 to the sewer.

It should be particularly noted at this time, that the detailed construction of the dome or cover plate 2, in combination with the screen 26 and distributing plate 27, readily permits of their removal and replacement, which replacement becomes necessary to permit of the continuous service to which such a filter is subjected.

The tapering of the walls of the filter as shown on the drawing (Figure 1) prevents the filtering beds from shrinking away from actual contact with the walls of the cylinder, which shrinking would leave a small space open and thus destroy the purpose of a filter bed, by leaving the water short circuit through the bed and out the discharge without passing through the filtering and deodorizing mediums. With this construction, as the filter beds shrink, or contract, due to the pressure of the plate 27 on the beds, the quartz and bone black crystals are forced into actual mechanical contact with the walls and held there.

Having thus described my invention, what I claim as new and desire to secure by Letters Patent, is:—

A water filter comprising an open top cylindrical shell having tapering walls terminating into a semispherical bottom, a semispherical closure for the top thereof recessed to receive the top edge of the open shell, an inner peripheral shoulder forming a part of said closure, a wire mesh screen seating on said shoulder, a perforated water distributing plate removably affixed to said closure likewise seating on said shoulder and adapted to hold said screen in contact therewith, said plate being provided with integral radial baffles adapted to direct the flow of water therethru, a resilient gasket interposed between the recess in said closure and the shell, a yoke pivoted to the exterior walls of said cylinder, a set screw threaded thru the yoke and seating against the exterior surface of said closure, a granular filtering medium carried in said shell under a pressure exerted by the adjustment of said closure to said shell, a screened drain fitting removably assembled to the bottom of said shell and extending therethru, and a pipe manifold connecting said semispherical closure to said drain fitting.

ROY BLAIR EVERSON.